(12) United States Patent
Yang et al.

(10) Patent No.: US 9,059,806 B2
(45) Date of Patent: Jun. 16, 2015

(54) OPTICAL COMMUNICATION SYSTEM, TRANSMISSION APPARATUS AND RECEPTION APPARATUS, AND TRANSMISSION METHOD AND RECEPTION METHOD

(75) Inventors: Qi Yang, Wuhan (CN); Zhu Yang, Wuhan (CN); Shaohua Yu, Wuhan (CN)

(73) Assignee: WUHAN RESEARCH INSTITUTE OF POSTS AND TELECOMMUNICATIONS, Wuhan, Hubei Province (CN)

( * ) Notice: Subject to any disclaimer, the term of this patent is extended or adjusted under 35 U.S.C. 154(b) by 462 days.

(21) Appl. No.: 13/488,659

(22) Filed: Jun. 5, 2012

(65) Prior Publication Data

US 2013/0216231 A1    Aug. 22, 2013

(30) Foreign Application Priority Data

Feb. 16, 2012    (CN) .......................... 2012 1 0035044

(51) Int. Cl.
| | |
|---|---|
| *H04B 10/00* | (2013.01) |
| *H04B 10/04* | (2006.01) |
| *H04B 10/06* | (2006.01) |
| *H04B 10/516* | (2013.01) |
| *H04B 10/556* | (2013.01) |
| *H04L 27/26* | (2006.01) |

(52) U.S. Cl.
CPC ........ *H04B 10/5161* (2013.01); *H04B 10/5563* (2013.01); *H04L 27/2614* (2013.01); *H04L 27/2636* (2013.01); *H04L 27/2697* (2013.01)

(58) Field of Classification Search
CPC .. H04B 10/50; H04B 10/5051; H04B 10/516; H04B 10/5161; H04B 10/54; H04B 10/541; H04B 10/548; H04B 10/5536; H04B 10/60; H04B 14/00; H04B 14/002; H04B 14/004; H04B 14/006; H04B 14/023
See application file for complete search history.

(56) References Cited

U.S. PATENT DOCUMENTS

2010/0092181 A1*    4/2010    Roberts et al. ................ 398/159

* cited by examiner

*Primary Examiner* — Darren E Wolf
(74) *Attorney, Agent, or Firm* — Vierra Magen Marcus LLP (57) ABSTRACT

An optical communication system, a transmission apparatus and a reception apparatus, and a transmission method and a reception method are provided. The transmission apparatus transmits an optical signal, and comprises: at least one encoder for encoding at least one data signal, respectively; at least one first modulator for performing first modulation on the at least one encoded data signal, respectively, and generating at least one first modulated signal; at least one second modulator for performing second modulation, which is DFT-spread-OFDM modulation, on the at least one first modulated signal, respectively, and generating at least one second modulated signal; and an up-converter for up-converting the at least one second modulated signal into the optical signal to be transmitted. Thus, a PAPR of the optical OFDM transmission signal is decreased, a signal distortion caused by non-linearity of optical devices is reduced, and a reception quality of the signal is improved.

16 Claims, 7 Drawing Sheets

OPTICAL COMMUNICATION SYSTEM, TRANSMISSION APPARATUS AND RECEPTION APPARATUS, AND TRANSMISSION METHOD AND RECEPTION METHOD

This application is based upon and claims the benefit of priority from the prior Chinese Patent Application CN201210035044.9, filed in the State Intellectual Property Office of the P.R.C. on Feb. 16, 2012, the disclosure of which is hereby incorporated by reference in its entirety.

FIELD OF THE INVENTION

The invention generally relates to optical communication, and in particular, to an optical communication system, a transmission apparatus and a reception apparatus for an optical signal, and a transmission method and a reception method for an optical signal, which have an improved performance.

DESCRIPTION OF RELATED ART

Orthogonal Frequency Division Multiplexing (OFDM) technology has been applied to the wireless communication field due to its advantages such as a strong ability of anti-multipath fading, a high frequency spectrum utilization efficiency, and so on. In recent years, such technology has also been applied to the optical communication field gradually to realize a long-distance and high-speed optical transmission.

However, when data are transmitted by using an optical OFDM transmission signal, the transmission signal would present a noise-like waveform in time domain, and thus has a much higher Peak to Average Power Ratio (PAPR) as compared with a single-carrier transmission. In general, the PAPR value of the optical OFDM transmission signal is 10 dB~30 dB. Due to non-linear effects of optical amplifiers, modulators, and the like used in the optical communication system and of the optical fiber itself, an over-high PAPR would lead to a serious distortion of the optical signal during transmission, such that the signal received at a receiving side has a decreased quality and an increased bit error rate, which decreases the performance of the optical communication system.

Therefore, an optical communication system, a transmission apparatus and a reception apparatus for an optical signal, and a transmission method and a reception method for an optical signal, which may increase the reception quality of the optical transmission signal and thus have a higher performance as compared with the conventional optical OFDM communication system, are needed.

SUMMARY OF THE INVENTION

The present invention provides an optical communication system, a transmission apparatus and a reception apparatus for an optical signal, and a transmission method and a reception method for an optical signal, which may decrease the PAPR of an optical OFDM transmission signal so that the distortion of the transmission signal caused by non-linearity may be suppressed, and therefore may improve the reception quality of the optical transmission signal and the performance of the optical communication system as compared with the conventional optical OFDM communication system.

According to an aspect of the present invention, there is provided a transmission apparatus for transmitting an optical signal, comprising: at least one encoder for encoding at least one data signal, respectively; at least one first modulator for performing first modulation on the at least one encoded data signal, respectively, and generating at least one first modulated signal; at least one second modulator for performing second modulation on the at least one first modulated signal, respectively, and generating at least one second modulated signal; and a up-converter for up-converting the at least one second modulated signal into the optical signal to be transmitted, wherein the second modulation is a DFT-spread-OFDM modulation.

According to another aspect of the present invention, there is provided a reception apparatus for receiving an optical signal, comprising: a down-converter for down-converting the optical signal into at least one electrical signal; at least one first demodulator for performing first demodulation on the at least one electrical signal, respectively, and generating at least one first demodulated signal; at least one second demodulator for performing second demodulation on the at least one first demodulated signal, respectively, and generating at least one second demodulated signal; and at least one decoder for decoding the at least one second demodulated signal respectively to restore data included therein, wherein the first demodulation is a DFT-spread-OFDM demodulation.

According to a yet another aspect of the present invention, there is provided a transmission method for transmitting an optical signal, comprising: encoding at least one data signal, respectively; performing first modulation on the at least one encoded data signal, respectively, and generating at least one first modulated signal; performing second modulation on the at least one first modulated signal, respectively, and generating at least one second modulated signal; and up-converting the at least one second modulated signal into the optical signal to be transmitted, wherein the second modulation is a DFT-spread-OFDM modulation.

According to a still another aspect of the present invention, there is provided a reception method for receiving an optical signal, comprising: down-converting the optical signal into at least one electrical signal; performing first demodulation on the at least one electrical signal, respectively, and generating at least one first demodulated signal; performing second demodulation on the at least one first demodulated signal, respectively, and generating at least one second demodulated signal; and decoding the at least one second demodulated signal respectively to restore data included therein, wherein the first demodulation is a DFT-spread-OFDM demodulation.

In the above aspects of the present invention, a data signal is subject to the DFT-spread-OFDM modulation at the transmitting side, thereby the PAPR of the optical signal transmitted in the optical communication system may be decreased, so that a signal deterioration and an increase of the bit error rate caused by the high PAPR may be suppressed, the reception quality of the signal may be increased, and in turn the performance of the optical communication system may be improved.

BRIEF DESCRIPTION OF THE DRAWINGS

The above and other objects, features and advantages of the present invention will become apparent from the detailed description of embodiments thereof taken in conjunction with the accompanying drawings, in which.

DETAILED DESCRIPTION OF THE INVENTION

An optical communication system, a transmission apparatus and a reception apparatus for an optical signal, and a transmission method and a reception method for an optical signal according to embodiments of the present invention will be described with reference to the drawings. In the drawings, like reference signs refer to like elements.

First, the optical communication system according to an embodiment of the present invention will be described with reference to FIG. 1.

Figure 1:
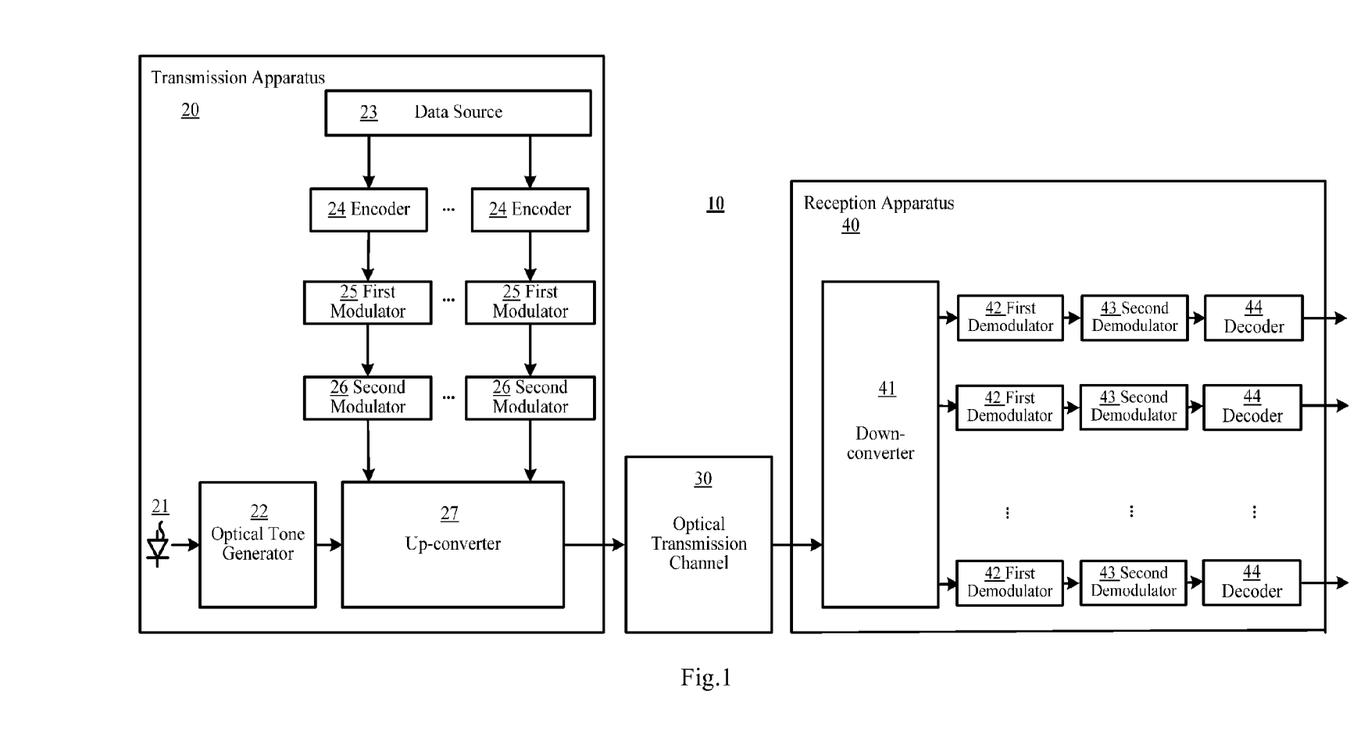
FIG. 1 is a block diagram illustrating a configuration of an optical communication system according to an embodiment of the present invention.

As illustrated in FIG. 1, the optical communication system 10 comprises a transmission apparatus 20, an optical transmission channel 30 and a reception apparatus 40. The transmission apparatus 20 and the reception apparatus 40 are coupled to the optical transmission channel 30, and communicate with each other via the optical transmission channel 30.

The transmission apparatus 20 transmits an optical signal carrying data to the reception apparatus 40 via the optical transmission channel 30. The transmission apparatus 20 comprises a light source 21, an optical tone generator 22, a data source 23, at least one (denoted as $N_t$ for convenience of description, $N_t \geq 1$) encoder(s) 24, $N_t$ first modulators 25, $N_t$ second modulators 26 and an up-converter 27. As illustrated in FIG. 1, the $N_t$ encoders 24, the $N_t$ first modulators 25 and the $N_t$ second modulators 26 form $N_t$ branches, and the encoder 24, the first modulator 25 and the second modulator 26 are connected in series in each of the branches.

The light source 21 is, for example, a laser which generates a single continuous-wave (CW) optical carrier at a predetermined wavelength.

The optical tone generator 22 receives the single optical carrier, generates $N_t$ optical tones, i.e. $N_t$ optical carriers having different wavelengths, based on the single optical carrier, and transmits the $N_t$ optical tones to the up-converter 27. The optical tone generator 22 will be described in detail later with reference to FIGS. 2A-2C. In an example of generating 50 optical tones ($N_t$=50) based on a single optical carrier, each of the optical tones may carry a signal of 21.6-Gb/s so as to obtain a final net rate of 1.08 Tb/s.

The data source 23, which may be any data source commonly known in the art, provides data to be transmitted in the form of data signals (for example, bit sequences), and the data may originate from one or more users. The data source 23 provides the data signals to the $N_t$ encoders 24. In particular, the data to be transmitted are divided into $N_t$ portions, and each of the portions is carried by one data signal, so that all the data to be transmitted are carried by $N_t$ data signals, respectively, and each of the data signals is provided to one corresponding encoder.

The $N_t$ encoders 24 encode the $N_t$ data signals inputted thereto, respectively. A coding scheme which may be used is, for example, Forward Error Correction (FEC) coding. Preferably, the encoders 24 perform advanced coding on the data signals input thereto. For example, the advanced coding may be coding with a net coding gain above 5 dB at BER=$10^{-13}$ compared to BER-versus-OSNR performance of un-coded transmission, and may have a low coding rate, for example, a net coding rate between 20% and 85%. For example, the advanced coding may be a strong Error Correcting Code (ECC) scheme such as Low Density Parity Check (LDPC) coding, a Turbo coding scheme, or other advanced coding schemes known currently or developed in future.

The $N_t$ first modulators 25 receive the encoded data signals from the respective encoders 24, and perform first modulation on the encoded data signals, respectively, so as to generate $N_t$ first modulated signals. The first modulation performed on the encoded data signals received by each of the first modulators may be Phase Shift Keying (PSK) modulation or Quadrature Amplitude Modulation (QAM). Preferably, the first modulation is high-order modulation, such as M-PSK modulation, M-QAM modulation (M$\geq$4), or other high-order modulation schemes known currently or developed in future. More preferably, the first modulators 25 performs the M-PSK modulation on the encoded data signals, in which M is 4 or 8, thereby a frequency spectrum utilization efficiency and an anti-interference capability of the signals may be improved while amplitudes of the signals remain unchanged.

The $N_t$ second modulators 26 receive the first modulated signals from the respective first modulators 25, and perform second modulation on the first modulated signals, respectively, so as to generate $N_t$ second modulated signals. In this embodiment, the second modulation is DFT-spread-OFDM modulation. The second modulators 26 will be described in detail later with reference to FIG. 3.

The up-converter 27 up-converters the $N_t$ second modulated signals to an optical signal carrying all of the data to be transmitted, and the optical signal is transmitted to the reception apparatus 40 via the optical transmission channel 30.

Figure 2A:
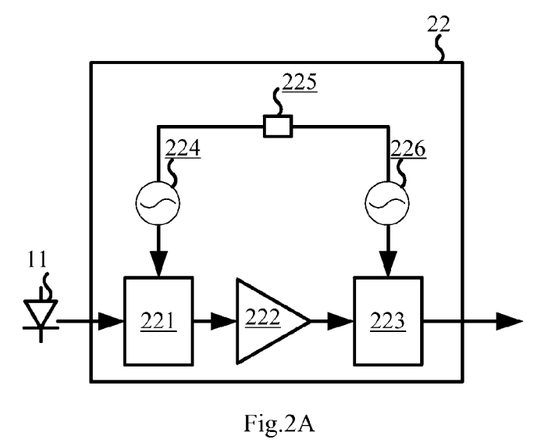
FIG. 2A is a block diagram illustrating an optical tone generator shown in FIG. 1.

Thereinafter, the optical tone generator 22 will be described in detail with reference to FIG. 2A-FIG. 2C. FIG. 2A is a block diagram illustrating the optical tone generator 22 shown in FIG. 1. As shown in FIG. 2A, the optical tone generator 22 comprises a first optical tone generating unit 221, a second optical tone generating unit 223 cascaded with the first optical tone generating unit 221, a first clock source 224, a common clock reference 225 and a second clock source 226. Preferably, the optical tone generator 22 further comprises an Erbium Doped Fiber Amplifier (EDFA) 222 disposed between the two optical tone generating units 221 and 223 so as to amplify optical tones generated by the first optical tone generating unit 221 and feed the amplified optical tones to the second optical tone generating unit 223.

Figure 2B:
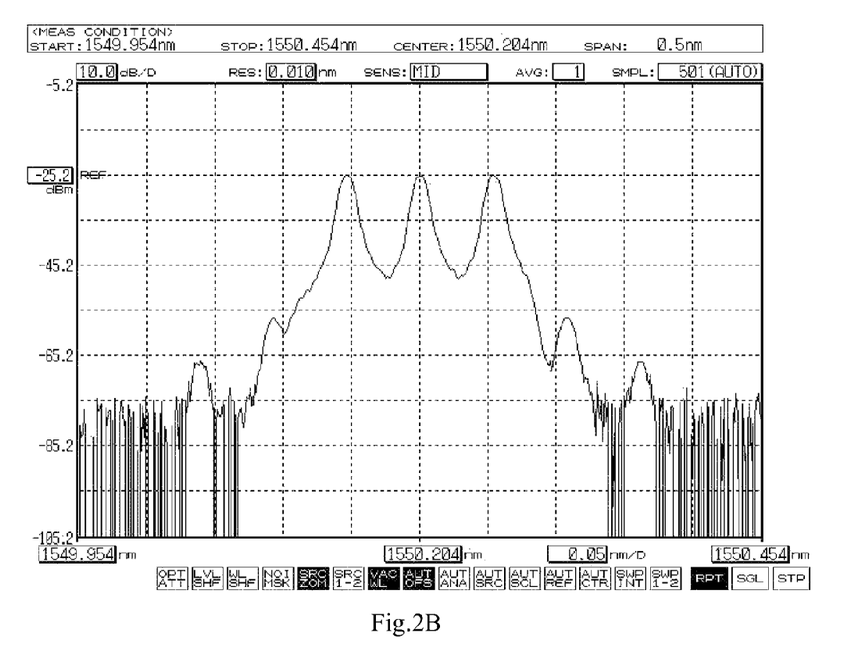
FIG. 2B illustrates an example of optical tones generated by applying one optical tone generating unit in the optical tone generator shown in FIG. 2A.
Figure 2C:
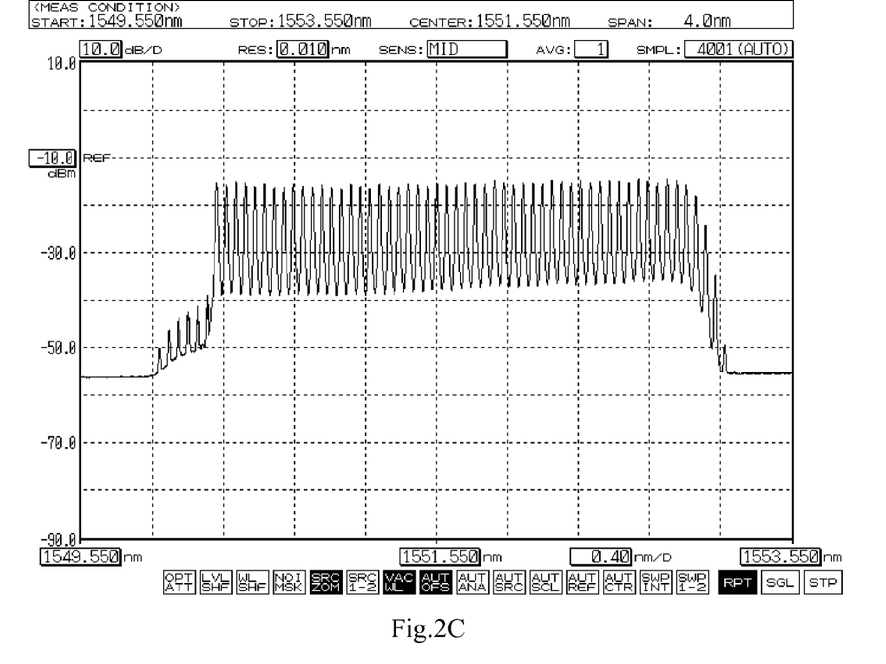
FIG. 2C illustrates an example of more optical tones generated by applying two cascaded optical tone generating units in the optical tone generator shown in FIG. 2A.

The first optical tone generating unit 221 generates multiple optical tones based on the CW optical carrier generated by the light source 21. Spacing of the generated optical tones, i.e. a frequency reference of the first optical tone generating unit 221, may be provided by a first clock source 224, which may be a radio frequency (RF) frequency synthesizer. For example, some optical components or devices in the first optical tone generating unit 221 may be finely tuned to produce the multiple optical tones at different wavelengths based on the single optical carrier. The first optical tone generating unit 221 may be an optical intensity modulator, and by adjusting its bias voltage and input RF power thereof, the first optical tone generating unit 221 may generate, for example, three optical tones with an even power level, as shown in FIG. 2B, in which case the spacing of the optical tones is 6.71875-GHz. The second optical tone generating unit 223 generates more (e.g. $N_t$) optical tones based on the inputted optical tones. The second optical tone generating unit 223 may be a re-circulating frequency shifter (RFS), which includes an optical I/Q modulator, an EDFA, etc., as disclosed in Yiran Ma's post-deadline work in OFC'2009. Similar to the first optical tone generating unit, a frequency reference of the second optical tone generating unit 223 may be provided by a second clock source 226. The common clock reference 225 is used to lock the two clock sources, so as to lock frequency stability for the clock sources. By applying the two cascaded optical tone generating units, a large number of optical tones may be effectively generated based on a single optical carrier. In the above 1.08-Tb/s example, the second optical tone generating unit 223 may further produce more than 17 optical tones for each of the inputted optical tones, and the tone spacing is driven at 20.15625-GHz. Thus, when the three tones generated by the first optical tone generating unit are inputted, the second tone generating unit 223 can produce at least 51 (=3×17) optical tones. In an example, by tuning a bandwidth and a center wavelength of an optical filter in the optical tone generating units, at least 50 optical tones with a signal-to-noise ratio of more than 20 dB can be generated, as shown in FIG. 2C. It is to be noted that, although the example in which two optical tone generating units are used in the optical tone generator 22 is given above, the number of the optical tone generating units is not limited to 2, and may be changed according to different requirements for the optical tones and/or other factors. Specifically, only one optical tone generating unit may be used in the optical tone generator 22 to generate multiple optical tones. Alternatively, three or more optical tone generating units may be used in the optical tone generator 22 to generate the optical tones. Additionally, the number of the generated optical tones may be one or more, and the types of the respective optical tone generating units are not limited to the intensity modulator or the RFS, and may be other types commonly known in the art. Accordingly, the configuration of the optical tone generator 22 may vary depending on different requirements for the optical tones and different generating methods.

Next, the second modulators 26 shown in FIG. 1 will be described with reference to FIG. 3. The second modulators 26 are DFT-spread-OFDM modulators. Because structures and operations of the $N_t$ second modulators shown in FIG. 1 are substantially the same, only one second modulator 26 will be described below and such description is also applicable to the other second modulators.

Figure 3:
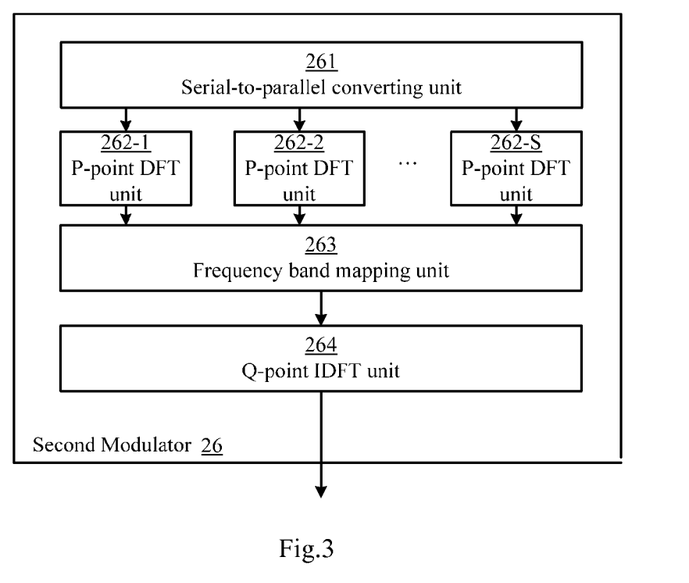
FIG. 3 is a block diagram illustrating a second modulator shown in FIG. 1.

As illustrated in FIG. 3, the second modulator 26 comprises: a serial-to-parallel converting unit 261; S P-point Discrete Fourier Transform (DFT) units 262-1, 262-2, ..., 262-S (S≥1); a frequency band mapping unit 263; and a Q-point Inverse Discrete Fourier Transform (IDFT) unit 264, in which Q≥S*P.

The serial-to-parallel converting unit 261 receives the first modulated signal inputted to the second modulator 26 from a corresponding first modulator 25, and performs a serial-to-parallel conversion on the signal, so as to generate S parallel modulation signals each of which has a length (i.e. the number of symbols) of P (P≥1) and is inputted to a corresponding one of the P-point DFT units.

Each of the P-point DFT units 262-1, 262-2, ..., 262-S performs P-point Discrete Fourier Transform on the inputted one of the parallel modulation signals, so as to convert the parallel modulation signals in time domain into signals in frequency domain. The transformed signals are inputted to the frequency band mapping unit 263. In particular, the P-point Discrete Fourier Transform performed on each of the parallel modulation signals may result in P output signals, and the output signals are inputted to the frequency band mapping unit 263. Therefore, S*P output signals in total are provided to the frequency band mapping unit 263.

The frequency band mapping unit 263 maps the signals inputted from each of the DFT units to predetermined frequency positions. Specifically, the frequency band mapping unit 263 maps the signals inputted from each of the DFT units to the predetermined frequency positions according to a predetermined mapping mode. For example, the P output signals generated by each of the DFT units may be mapped to P consecutive frequency positions in a localized manner, and the output signals from different DFT units may be mapped to different frequency positions in a distributed or consecutive manner. In this way, the frequency band mapping unit 263 maps the S*P output signals to different frequency positions.

The Q-point IDFT unit 264 performs Inverse Discrete Fourier Transform on the mapped signals generated by the frequency band mapping unit 263 to perform OFDM modulation, so as to convert the signals in frequency domain into a signal in time domain which is outputted to the up-converter 27 as the second modulated signal.

In the above manner, the $N_t$ second modulators 26 provide the up-converter 27 with the $N_t$ second modulated signals.

Figure 4:
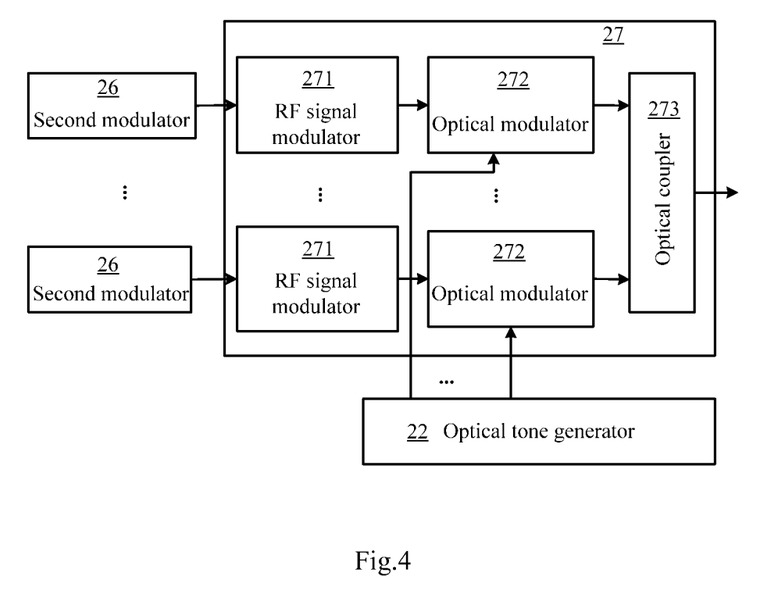
FIG. 4 is a block diagram illustrating an up-converter shown in FIG. 1.

Next, the up-converter 27 shown in FIG. 1 will be described with reference to FIG. 4. As illustrated in FIG. 4, the up-converter 27 comprises $N_t$ RF signal modulators 271 and associated $N_t$ optical modulators 272, and an optical coupler 237.

The $N_t$ RF signal modulators 271 receive the $N_t$ second modulated signals, respectively, and RF-modulate (or convert) them into $N_t$ RF sub-band signals (in electrical domain). Each of the RF sub-band signals occupies a part (sub-band) of an entire frequency band which may be occupied for transmission of all of the data. The manner of performing the RF modulation is well known in the art, therefore a detailed description thereof is omitted herein.

The optical modulators 272 receive the RF sub-band signals from the respective RF signal modulators, optically modulate the $N_t$ RF sub-band signals onto corresponding optical tones provided by the optical tone generator 22, respectively, so as to generate $N_t$ optical sub-band signals (in optical domain), and supply the optical sub-band signals to the optical coupler 273.

The optical coupler 273 couples the $N_t$ optical sub-band signals into an optical signal occupying the entire frequency band and carrying all of the data to be transmitted, and then outputs the optical signal.

The optical signal is transmitted to the receiving side via the optical transmission channel 30.

The optical transmission channel 30 may be a fiber link formed of a Standard Single-Mode Fiber (SSMF). If necessary, one or more EDFAs (not shown in the figure) could be disposed in the optical transmission channel 30 to amplify the transmitted optical signal, so that a fiber loss during the transmission may be compensated for.

The reception apparatus 40 receives the optical signal transmitted from the transmission apparatus 20 via the optical transmission channel 30, and recovers the transmitted data from the optical signal. Hereinafter, the reception apparatus 40 will be described with reference to FIG. 1.

As illustrated in FIG. 1, the reception apparatus 40 comprises a down-converter 41, at least one (denoted as $N_r$ for convenience of description, $N_r \geq 1$) first demodulator(s) 42, $N_r$ second demodulators 43 and $N_r$ decoders 44. Preferably, $N_t$ is equal to $N_r$. As illustrated in FIG. 1, the $N_r$ first demodulators 42, the $N_r$ second demodulators 43 and the $N_r$ decoders 44 form $N_r$ branches, and in each of the branches, the first demodulator 42, the second demodulator 43 and the decoder 44 are connected in series.

The down-converter 41 down-converts the received optical signal into $N_r$ data signals (electrical signals), and outputs these data signals to the $N_r$ first demodulators 42, respectively. Each of the data signals carries a portion of the data transmitted at the transmission apparatus.

The $N_r$ first demodulators 42 perform first demodulation on the $N_r$ data signals, respectively, and generate respective first demodulated signals. The first demodulation is DFT-spread-OFDM demodulation corresponding to the DFT-spread-OFDM modulation performed in the transmission apparatus. The first demodulators 42 will be described in detail later.

The $N_r$ second demodulators 43 receive the first demodulated signals from the corresponding first demodulators 42, respectively, and perform second demodulation on these signals, so as to obtain $N_r$ second demodulated signals. This second demodulation corresponds to the first modulation performed in the transmission apparatus 20. When the first modulation performed in the transmission apparatus 20 is PSK modulation or QAM modulation, the corresponding PSK demodulation or QAM demodulation is performed in the second demodulators 43. Alternatively, when the first modulation is high-order modulation, the second demodulators 43 perform corresponding high-order demodulation. For example, if the first modulation is M-PSK modulation or M-QAM modulation (M≥4), the second demodulators 43 may perform corresponding M-PSK demodulation or M-QAM demodulation. Alternatively, if 4-PSK or 8-PSK modulation is performed at the transmitting side, the second demodulators 43 perform corresponding 4-PSK or 8-PSK demodulation. Additionally, the outputs of the second demodulators 43 determine a decision scheme used in the decoders 44. Specifically, the decoders 44 may use a hard-decision scheme if the second demodulators 43 output binary data bits; and the decoders 44 may use a soft-decision scheme if the second demodulators 43 output likelihoods of the binary data bits. The soft-decision scheme has a further improvement over the hard-decision scheme.

Subsequently, each of the $N_r$ decoders 44 receives the second demodulated signal from the respective second demodulator 43, and decodes the second demodulated signal so as to recover data carried therein. The decoding corresponds to the encoding performed at the transmission apparatus 20. In particular, each of the decoders 44 uses a decoding scheme having a same rate and type as those of the coding scheme used in the transmission apparatus to decode the received one of the second demodulated signals. For example, if advanced coding is used in the transmission apparatus, the decoders 44 perform corresponding advanced decoding on the second demodulated signals. Specifically, if a LDPC coding scheme is used in the transmission apparatus, the decoders 44 use a corresponding LDPC decoding algorithm having a same coding rate, such as a log-domain sum-product algorithm, to perform decoding. Thereby, the originally transmitted data may be recovered from the received optical signal.

Thereinafter, the down-converter 41 will be described in detail with reference to FIG. 5.

Figure 5:
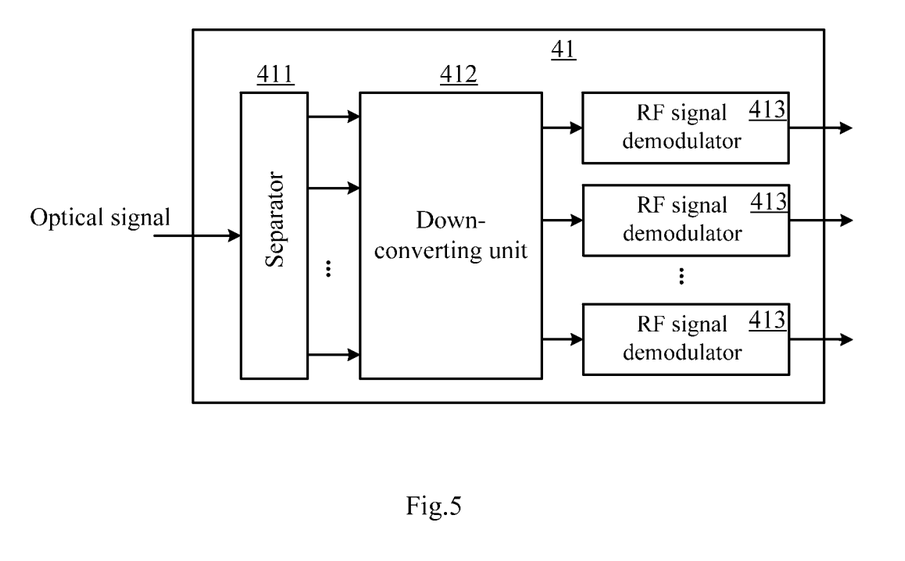
FIG. 5 is a block diagram illustrating a down-converter shown in FIG. 1.

As illustrated in FIG. 5, the down-converter 41 comprises a separator 411, a down-converting unit 412 and $N_r$ RF signal demodulators 413.

The separator 411 separates the optical signal received through the optical transmission channel 30 into $N_r$ optical sub-band signals (each of which occupies a part of the entire transmitting frequency band), and supplies the $N_r$ optical sub-band signals to the down-converting unit 412. The optical sub-band separator 411 may separate the optical signal by using $N_r$ band-pass filters, each of which selects and outputs one of the optical sub-band signals.

The down-converting unit 412 down-converts the respective optical sub-band signals to RF sub-band signals, respectively, and supplies the obtained $N_r$ RF sub-band signals to the corresponding RF signal demodulators 413, respectively. The down-converting unit 412 will be described in detail later.

The $N_r$ RF signal demodulators 413 RF-demodulate (or convert) the $N_r$ RF sub-band signals received from the down-converting unit 412 to $N_r$ data signals (electrical signals), respectively, and supply the data signals to the $N_r$ first demodulators 42 downstream, respectively.

Thereinafter, the down-converting unit 412 will be described with reference to FIG. 6.

Figure 6:
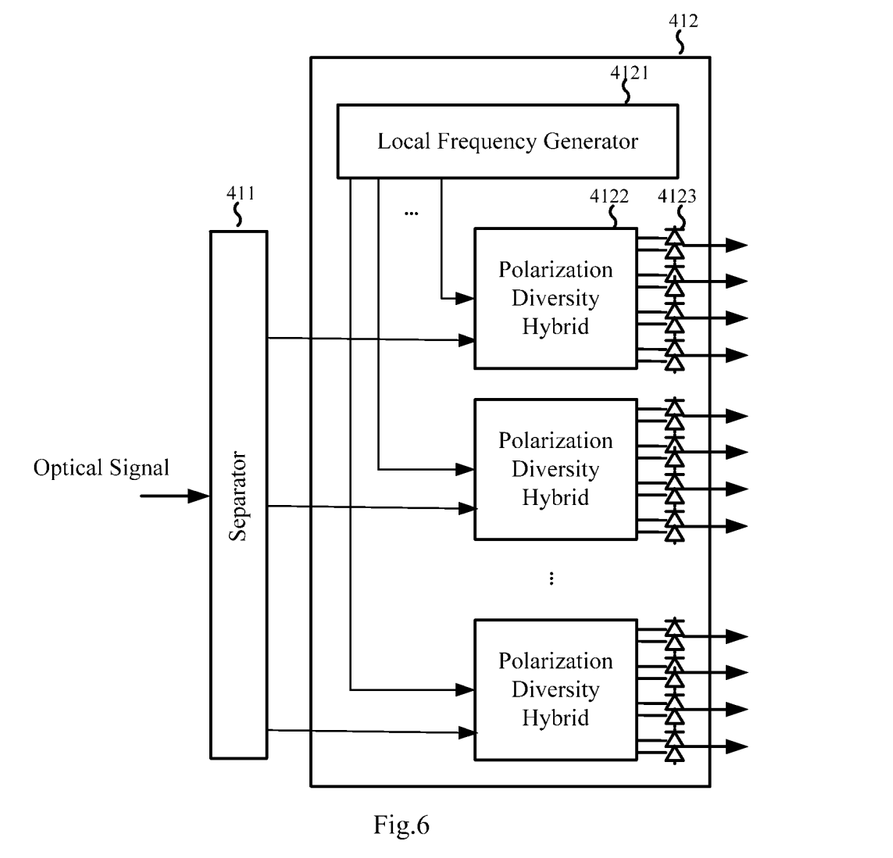
FIG. 6 is a detailed block diagram illustrating a down-converting unit shown in FIG. 5.

As illustrated in FIG. 6, the down-converting unit 412 comprises a local frequency generator 4121, at least one group of polarization diversity optical hybrids 4122, and photo-diodes 4123.

The $N_r$ optical sub-band signals outputted from the separator 411 are inputted to the polarization diversity optical hybrids 4122, respectively, as illustrated in FIG. 6. The local frequency generator 4121 generates $N_r$ local oscillating signals having different frequencies, and supplies the local oscillating signals to the respective polarization diversity optical hybrids 4122, the frequency of each of the local oscillating signals being tuned to be close to a center of a sub-band of the optical sub-band signal inputted into the corresponding polarization diversity optical hybrid 4122. The local frequency generator 4121 may generate the local oscillating signals in various manners. For example, the local frequency generator may include $N_r$ lasers, each of which generates one of the local oscillating signals. The local frequency generator 4121 may also generate optical signals having $N_r$ frequencies in a similar manner to that used in the optical tone generator described in FIG. 2, and then separate the optical signals by using separator(s) to obtain the respective local oscillating signals. Alternatively, the local frequency generator 4121 may generate the local oscillating signals by using a combination of the optical tone generator and one or more lasers. It is to be noted that, although only one local frequency generator is shown to generate the $N_r$ local oscillating signals in FIG. 6, this is only illustrative, and one or more local frequency generators could be used to generate the $N_r$ local oscillating signals.

Each of the local oscillating signals beats with the optical sub-band signal in the corresponding polarization diversity optical hybrid 4122, and then is detected by for example four pairs of balanced photo-diodes 4123 in a coherent heterodyne fashion, so that each of the optical sub-band signals is converted into a RF sub-band signal. The particular manner for converting each of the optical sub-band signals into the RF sub-band signal by the local frequency generator, the polarization diversity optical hybrid, and the photo-diodes is well known in the art, thus detailed descriptions thereof are omitted here for simplicity. Additionally, the down-converting unit 412 may convert the optical sub-band signals in other manners, besides the one shown in FIG. 6.

Next, the first demodulators 42 illustrated in FIG. 1 will be described with reference to FIG. 7, and the demodulation performed by the first demodulators 42 is an inverse process of the modulation performed by the second modulators 26 described above. Because structures and operations of the $N_r$ first demodulators shown in FIG. 1 are substantially the same, only one of the first demodulators 42 will be described thereinafter, and this description is also applicable for the other first demodulators.

Figure 7:
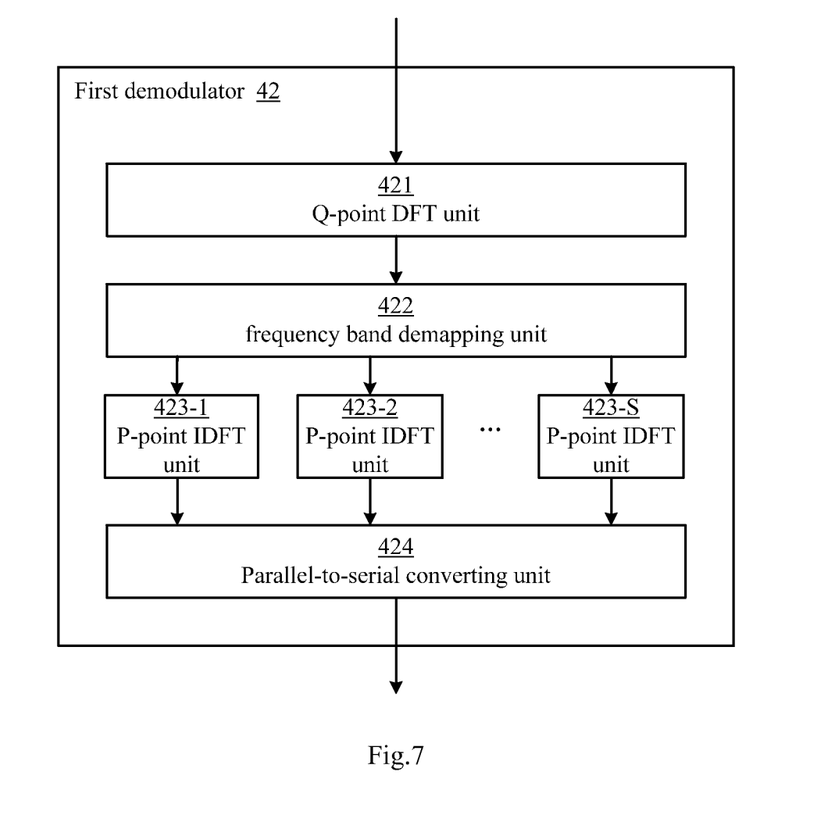
FIG. 7 is a block diagram illustrating a first demodulator shown in FIG. 1.

As illustrated in FIG. 7, the first demodulator 42 comprises a Q-point DFT unit 421, a frequency band demapping unit 422, S P-point IDFT units 423-1, 423-2, ..., 423-S (S≥1), and a parallel-to-serial converting unit 424, wherein Q≥S*P.

The Q-point DFT unit 421 performs a DFT transform on one of the data signals inputted from the down-converter 41, so as to convert the data signal in time domain to a signal in frequency domain.

The frequency band demapping unit 422 demaps the DFT-transformed signal. In particular, the frequency band demapping unit 422 determines frequency positions to which signals have been mapped according to the mapping mode used in the transmission apparatus, and demaps the DFT-transformed signal in this frequency domain based on the determined frequency positions. Then, the frequency band demapping unit 422 outputs the signals obtained by the demapping to the S P-point IDFT units 423-1, 423-2, ..., 423-S, respectively.

The S P-point IDFT units 423-1, 423-2, ..., 423-S perform P-point Inverse Discrete Fourier Transforms on the input signals, respectively, so as to convert the signals in time domain into signals in frequency domain.

The parallel-to-serial converting unit 424 converts the signals (parallel) outputted from the respective IDFT units into a serial signal, and outputs the serial signal, as the first demodulated signal, to the second demodulator 43 downstream.

In above-described embodiment of the present invention, the PAPR of the optical transmission signal may be decreased by performing the DFT-spread-OFDM modulation on the data signal at the transmitting side, so that the signal distortion caused by non-linearity of optical devices and optical fibers in the transmission process may be reduced, and the signal reception quality at the receiving side may be improved. Furthermore, in a preferred embodiment of the present invention, when the advanced coding and the high-order modulation are performed on the data signal at the transmitting side, a sensitivity of the optical communication system may be improved, thereby a high-speed long-distance optical transmission can be realized.

Hereinafter, a transmission method for transmitting an optical signal and a reception method for receiving an optical signal according to an embodiment of the present invention will be described.

Figure 8:
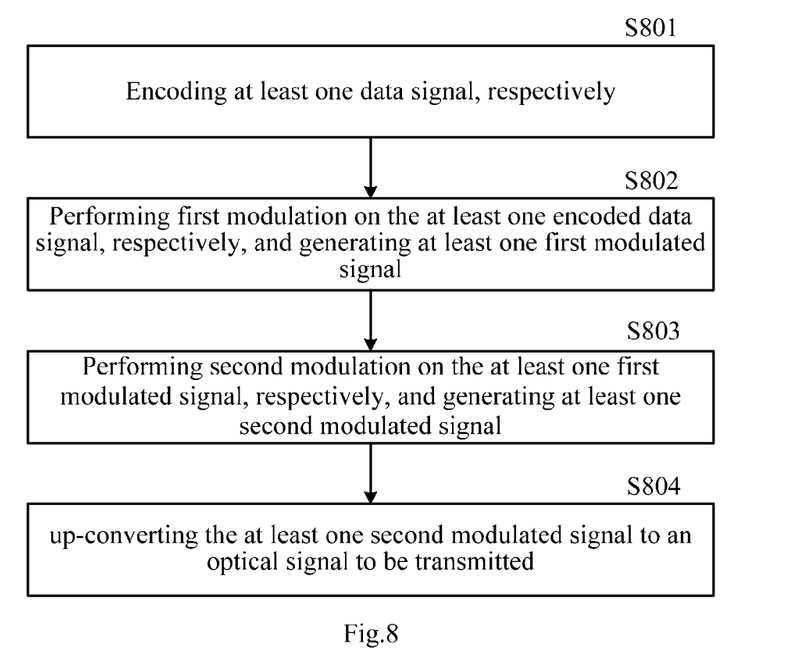
FIG. 8 is a flowchart illustrating a transmission method for transmitting an optical signal according to an embodiment of the present invention.

FIG. 8 shows a flowchart of the transmission method for transmitting an optical signal according to a first embodiment of the present invention. The transmission method may be performed by the transmission apparatus 20.

As illustrated in FIG. 8, in step S801, one or more (also denoted as $N_t$ for convenience of description) data signals are encoded, respectively. As described above, the $N_t$ data signals carry data to be transmitted, which may originate from the data source 23 shown in FIG. 1. The encoding performed is, for example, FEC coding. Preferably, the one or more data signals are subject to advanced coding. For example, the advanced coding may be coding with a net coding gain above 5 dB at BER=$10^{-13}$ compared to BER-versus-OSNR performance of un-coded transmission, and may have a low coding rate, for example, a net coding rate between 20% and 85%. The advanced coding may be, for example, LDPC coding, Turbo coding, or other advanced coding schemes known currently or developed in future.

Next, in Step 802, first modulation is performed on the $N_t$ encoded data signals generated in step S801, respectively, so as to generate $N_t$ first modulated signals.

As described above, the first modulation may be PSK modulation or QAM modulation. Preferably, the first modulation is high-order modulation, for example, M-PSK modulation or M-QAM modulation (M≥4), or other high-order modulation schemes known currently or developed in future. More preferably, the first modulation is M-PSK modulation with M being 4 or 8.

Subsequently, in Step S803, second modulation is performed on the $N_t$ first modulated signals generated in Step S802, respectively, so as to generate $N_t$ second modulated signals. In the embodiment, the second modulation is DFT-spread-OFDM modulation.

The second modulation may be carried out by the DFT-spread-OFDM modulator shown in FIG. 3. In particular, when the DFT-spread-OFDM modulation is performed on each of the first modulated signals, the first modulated signal is subjected to a serial-to-parallel conversion firstly, so as to be converted into S parallel modulated signals having a length of P. Then, each of the parallel modulated signals is subjected to a P-point DFT transform in order to generate P output signals. Performing the P-point DFT transform on the S parallel modulated signals would generate S*P output signals. Next, the S*P output signals are mapped to predetermined frequency positions. The mapping may be carried out according to a predetermined mapping mode. For example, in one mapping mode, the P output signals generated based on each parallel modulated signal are mapped to P consecutive frequency positions in a localized manner, whereas the output signals generated based on different parallel modulated signals are mapped to different frequency positions in a distributed or consecutive manner. Finally, the mapped signals are subjected to inverse discrete Fourier transform, so that the signals in frequency domain are converted into a signal in time domain, as the second modulated signal.

Next, in Step S804, the $N_t$ second modulated signals are up-converted to an optical signal and the optical signal is transmitted.

The up-converting step may be carried out by the up-converter 27 shown in FIG. 4. Specifically, the $N_t$ second modulated signals are RF-modulated into RF sub-band signals, respectively. Then, the RF sub-band signals are modulated onto corresponding optical tones (optical carriers), respectively, so as to generate at least one optical sub-band signal(s). Finally, the at least one optical sub-band signal(s) is combined (coupled) into the optical signal and the optical signal is outputted. The $N_t$ optical tones for the modulation may be generated by the optical tone generator described above based on a single optical carrier, or may be generated in other manners known in the art.

Thereinafter, the reception method for receiving an optical signal according to an embodiment of the present invention will be described with reference to FIG. 9. The reception method may be performed by the reception apparatus 40.

Figure 9:
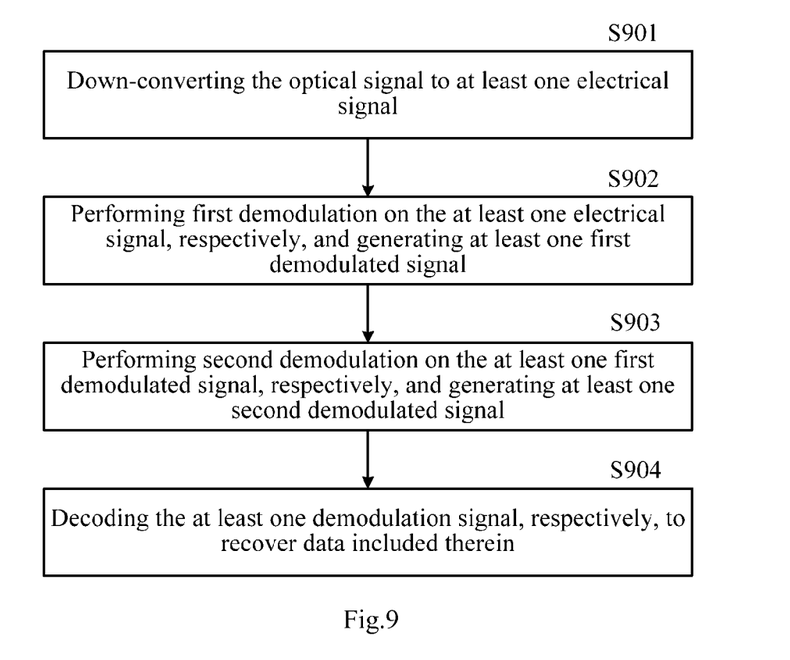
FIG. 9 is a flowchart illustrating a reception method for receiving an optical signal according to an embodiment of the present invention.

As illustrated in FIG. 9, in Step S901, the received optical signal is down-converted to at least one ($N_r$) electrical signal(s) (data signal in electrical domain).

The down-converting step may be carried out by the down-converter shown in FIG. 5. In particular, the optical signal is separated into $N_r$ optical sub-band signals firstly, and the $N_r$ optical sub-band signals are then down-converted to the RF sub-band signals. For example, the $N_r$ optical sub-band signals may be down-converted by using $N_r$ local oscillating signals, respectively. Finally, the obtained $N_r$ RF sub-band signals are demodulated to the at least one data signal(s).

Next, in Step S902, first demodulation, i.e. DFT-spread-OFDM demodulation, is performed on the $N_r$ electrical signals, so as to generate $N_r$ first demodulated signals.

The first demodulation performed at the receiving side is an inverse process of the second modulation performed at the transmitting side. Specifically, when the DFT-spread-OFDM demodulation is performed on each data signal generated in Step S901, the data signal is subjected to the DFT transform firstly, so that the data signal in time domain is converted to a signal in frequency domain. Then, the DFT-transformed signal is demapped. The demapping may be carried out according to the mapping mode used in the transmitting side. For example, frequency positions to which signals have been mapped may be determined according to the mapping mode used in the transmitting side; then, based on the determined frequency positions, the DFT-transformed signal is demapped in this frequency domain. Next, the signals obtained by the demapping are subjected to a P-point Inverse Discrete Fourier Transform, respectively, so that the signals in time domain are converted into signals in frequency domain. Finally, the plurality of parallel signals obtained as the result of the inverse transform are converted to a serial signal, and the serial signal is outputted as the first demodulated signal.

Subsequently, in Step S903, second demodulation is performed on the $N_r$ first demodulated signals, respectively, to obtain $N_r$ second demodulated signals. This second demodulation corresponds to the first modulation performed at the transmitting side. For example, when PSK modulation or QAM modulation is performed at the transmitting side, the corresponding PSK demodulation or QAM demodulation is performed on the first demodulated signals in Step S903. Alternatively, when the first modulation performed at the transmitting side is high-order modulation, corresponding high-order demodulation is performed in Step S903. For example, if M-PSK modulation (M is 4 or 8) is performed at the transmitting side, corresponding M-PSK demodulation will be performed in Step S903.

Next, in Step S904, the obtained $N_r$ second demodulated signals are decoded to recover data included therein. The decoding performed herein corresponds to the encoding performed at the transmitting side. That is, a decoding scheme, which has the same rate and type as those of the coding scheme used in the transmitting side, is used in Step S904 to decode the second demodulated signals. For example, if FEC coding or advanced coding is performed at the transmitting side, the corresponding FEC decoding or advanced decoding is performed in Step S904. For example, if a LDPC coding scheme is used at the transmitting side, a corresponding LDPC decoding algorithm having the same coding rate as that of the LDPC coding scheme, such as a log-domain sum-product algorithm, is used in Step S904 to perform the decoding.

Thus, the reception of the optical signal is implemented, and data carried by the optical signal are recovered.

In the above embodiments of the present invention, the PAPR of the generated optical transmission signal may be decreased by performing the DFT-spread-OFDM modulation on the signal to be transmitted, so that the signal distortion caused by non-linearity of optical devices and optical fibers used in the optical communication system may be reduced, the reception quality of the optical signal at the receiving side may be improved, and in turn the performance of the optical communication system may be improved. Furthermore, the sensitivity of the optical communication system may be improved by preferably performing the advanced coding and the high-order modulation on the signal prior to the DFT-spread-OFDM modulation, thus a high-speed long-distance optical transmission can be realized.

The optical communication system, the transmission apparatus and the reception apparatus for an optical signal, and the transmission method and the reception method for an optical signal according to the embodiments of the present invention are described above. However, it is to be noted that they are only illustrative, and those skilled in the art can make various modifications thereto without departing from the scope of the invention.

For example, in an alternative embodiment, in order to avoid an error floor which may be caused by the encoders, and eliminate an effect of burst errors occurring in the transmission and other adverse effects, an outer encoder and an interleaver may be added at upstream of the encoder 24 at the transmitting side (see FIG. 1), so as to perform outer coding and data interleaving on the data signal to be transmitted. The outer coding may eliminate a potential error floor which may be caused by the encoder 24 downstream. As an example, Reed-Solomon RS (255, 239) may be used as the outer coding scheme, so as to correct randomly distributed errors with a bit error rate (BER) under $\sim 2 \times 10^{-3}$. The interleaving may avoid the effect of burst errors. Accordingly, a de-interleaver and an outer decoder may be added at downstream of the decoder 44 at the receiving side (refer to FIG. 1), so as to perform de-interleaving and outer decoding on the decoded signal outputted from the decoder 44. The de-interleaver de-interleaves the decoded signal in a manner corresponding to the interleaving manner utilized in the interleaver, so as to reconstruct the date included therein. Then, the outer decoder decodes the reconstructed data in a decoding manner corresponding to the coding scheme utilized in the outer encoder, so as to recover the data transmitted at the transmitting side.

The exemplary embodiments of the present invention have been described above. It is to be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present invention.

It is to be understood that, when an element is referred to as being "connected" or "coupled" to another element, it can be directly connected or coupled to the another element or intervening elements may be present. In contrast, when an element is referred to as being "directly connected" or "directly coupled" to another element, there are no intervening elements present. Other words used to describe the relationship among elements should be interpreted in a similar fashion (e.g., "between" versus "directly between", "adjacent" versus "directly adjacent", etc.).

The terminology used herein is for the purpose of describing particular embodiments only, and is not intended to limit the exemplary embodiments of the present invention. As used herein, the singular forms "a", "an", and "the" are intended to include the plural forms as well, unless the context clearly indicates otherwise. As used herein, the terms "and/or" and "at least one" include any and all combinations of one or more of the associated listed items. It will be further understood that the terms "comprises", "comprising", "having", "includes" and/or "including", when used herein, specify the presence of stated features, integers, steps, operations, elements, and/or components, but do not preclude the presence or addition of one or more other features, integers, steps, operations, elements, components, and/or groups thereof.

It is also to be noted that in some alternative implementations, the functions/acts noted may occur out of the order noted in the figures. For example, two figures/functions/acts shown in succession may in fact be executed substantially concurrently or may sometimes be executed in a reverse order, depending upon the functionality/acts involved.

Although the exemplary embodiments of the invention have been shown and described, it is to be appreciated by those skilled in the art that various changes in forms and details may be made in the exemplary embodiments without departing from the spirit and scope of the invention as defined in the appended claims and their equivalents.

What is claimed is:

1. A transmission apparatus for transmitting an optical signal, comprising:
    at least one encoder configured to encode at least one data signal, respectively, the encoding having a net coding gain above 5 dB at BER=$10^{-13}$ compared to BER-versus-OSNR performance of un-coded transmission;
    at least one first modulator configured to perform first modulation on the at least one encoded data signal, respectively, and generate at least one first modulated signal;
    at least one second modulator configured to perform second modulation on the at least one first modulated signal, respectively, and generate at least one second modulated signal; and
    an up-converter configured to up-convert the at least one second modulated signal to the optical signal to be transmitted,
    wherein the second modulation is DFT-spread-OFDM modulation.

2. The transmission apparatus as claimed in claim 1, wherein the first modulation is Phase Shift Keying Modulation or Quadrature Amplitude Modulation.

3. The transmission apparatus as claimed in claim 1, wherein the first modulation is M-ary Phase Shift Keying Modulation, wherein M is 4 or 8.

4. The transmission apparatus as claimed in claim 1, wherein each of the second modulator comprises:
    a serial-to-parallel converting unit configured to convert the respective first modulated signal inputted to the second modulator to at least one parallel modulation signal;
    at least one Discrete Fourier Transform unit configured to perform Discrete Fourier Transform on the at least one parallel modulation signal;
    a mapping unit configured to map the at least one transformed parallel modulation signal to a predetermined frequency position; and
    an Inverse Discrete Fourier Transform unit configured to perform Inverse Discrete Fourier Transform on the mapped signal to generate the second modulated signal.

5. A reception apparatus for receiving an optical signal, comprising:
    a down-converter configured to down-convert the optical signal to at least one electrical signal;
    at least one first demodulator configured to perform first demodulation on the at least one electrical signal, respectively, and generate at least one first demodulated signal;
    at least one second demodulator configured to perform second demodulation on the at least one first demodulated signal, respectively, and generate at least one second demodulated signal; and
    at least one decoder configured to decode the at least one second demodulated signal, respectively, to recover data included therein, the decoding corresponding to coding with a net coding gain above 5 dB at BER=$10^{-13}$ compared to BER-versus-OSNR performance of un-coded transmission,
    wherein the first demodulation is DFT-spread-OFDM demodulation.

6. The reception apparatus as claimed in claim 5, wherein each of the first demodulator comprises:
    a Discrete Fourier Transformer configured to perform Discrete Fourier Transform on the respective electrical signal;
    a demapper configured to demap the transformed electrical signal;
    at least one Inverse Discrete Fourier Transformer configured to perform Inverse Discrete Fourier Transform on the demapped signal; and
    a parallel-to-serial converting unit configured to convert the inverse-transformed signal to a serial signal as the first demodulated signal.

7. The reception apparatus as claimed in claim 5, wherein the second demodulation is Phase Shift Keying Demodulation or Quadrature Amplitude Demodulation.

8. The reception apparatus as claimed in claim 5, wherein the second demodulation is M-ary Phase Shift Keying Demodulation, wherein M is 4 or 8.

9. A transmission method for transmitting an optical signal, comprising:
    encoding at least one data signal, respectively, the encoding having a net coding gain above 5 dB at BER=$10^{-13}$ compared to BER-versus-OSNR performance of un-coded transmission;
    performing first modulation on the at least one encoded data signal, respectively, and generating at least one first modulated signal;
    performing second modulation on the at least one first modulated signal, respectively, and generating at least one second modulated signal; and
    up-converting the at least one second modulated signal into the optical signal to be transmitted,
    wherein the second modulation is DFT-spread-OFDM modulation.

10. the transmission method as claimed in claim 9, wherein the first modulation is Phase Shift Keying Modulation or Quadrature Amplitude Modulation.

11. The transmission method as claimed in claim 9, wherein the first modulation is M-ary Phase Shift Keying Modulation, wherein M is 4 or 8.

12. The transmission method as claimed in claim 9, wherein the step of performing second modulation on each of the at least one first modulated signal comprises:
    converting the respective inputted first modulated signal to at least one parallel modulation signal;
    performing Discrete Fourier Transform on the at least one parallel modulation signal, respectively;
    mapping the at least one transformed parallel modulation signal to a predetermined frequency position; and
    performing Inverse Discrete Fourier Transform on the mapped signal to generate the second modulated signal.

13. A reception method for receiving an optical signal, comprising:
    down-converting the optical signal into at least one electrical signal;
    performing first demodulation on the at least one electrical signal, respectively, and generating at least one first demodulated signal;
    performing second demodulation on the at least one first demodulated signal, respectively, and generating at least one second demodulated signal; and
    decoding the at least one second demodulated signal, respectively, to recover data included therein, the decoding corresponding to coding with a net coding gain above 5 dB at BER=$10^{-13}$ compared to BER-versus-OSNR performance of un-coded transmission, wherein the first demodulation is DFT-spread-OFDM demodulation.

14. The reception method as claimed in claim 13, wherein the step of performing first demodulation on each of the at least one electrical signal comprises:

performing Discrete Fourier Transform on the respective electrical signal;

demapping the transformed electrical signal;

performing Inverse Discrete Fourier Transform on the demapped signal; and converting the inverse-transformed signals to a serial signal as the first demodulated signal.

15. The reception method as claimed in claim 13, wherein the second demodulation is Phase Shift Keying Demodulation or Quadrature Amplitude Demodulation.

16. The reception method as claimed in claim 13, wherein the second demodulation is M-ary Phase Shift Keying Demodulation, wherein M is 4 or 8.

* * * * *